(No Model.)
J. R. KUNZELMAN.
FISHING FLOAT.
No. 541,789. Patented June 25, 1895.
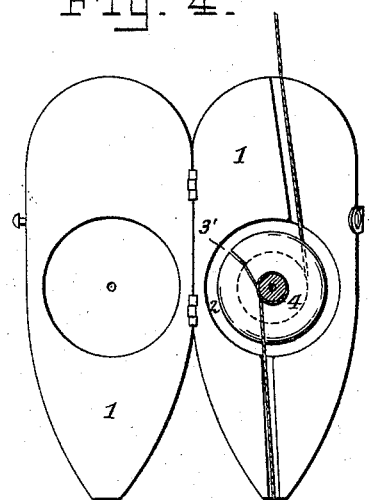
Fig. 4.
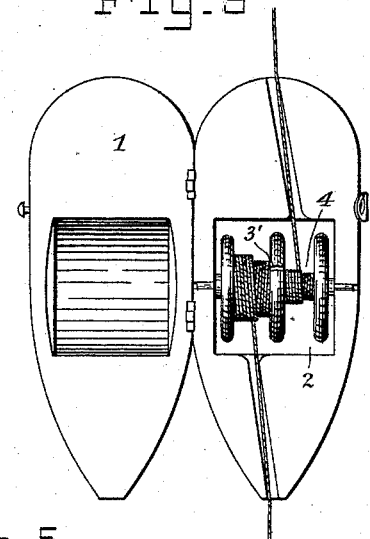
Fig. 3.
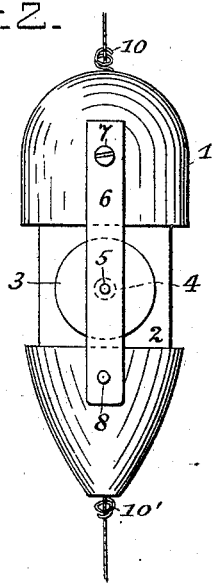
Fig. 2.
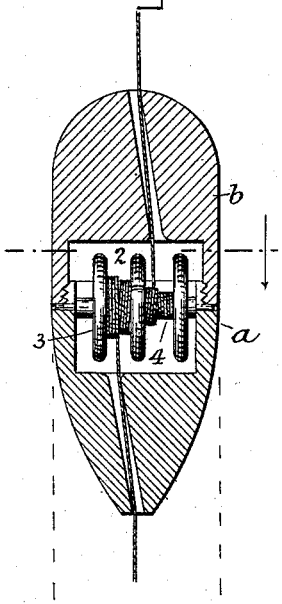
Fig. 5.
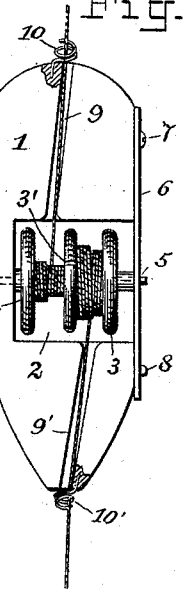
Fig. 1.
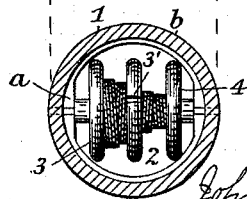
WITNESSES:
E. B. Bolton
E. K. Sturtevant
INVENTOR
John Rheinhart Kunzelman
BY
Richard R.
ATTORNEYS ic
UNITED STATES PATENT OFFICE.

JOHN RHEINHART KUNZELMAN, OF STILLWATER, MINNESOTA.

FISHING-FLOAT.

SPECIFICATION forming part of Letters Patent No. 541,789, dated June 25, 1895.

Application filed November 14, 1894. Serial No. 528,826. (No model.)

*To all whom it may concern:*

Be it known that I, JOHN RHEINHART KUNZELMAN, a citizen of the United States, residing at Stillwater, Washington county, Minnesota, have invented an Improvement in Fishing-Bobs, of which the following is a specification.

It is the object of my invention to provide a fishing bob which will automatically hold the bait and hook a predetermined distance from the bottom of the stream while fishing.

The invention is illustrated in the accompanying drawings, in which—

Figure 1 is a side view of the bob. Fig. 2 is a side elevation of the same a quarter turn from that of Fig. 1. Figs. 3, 4 and 5 are views of modifications.

In the drawings 1 indicates the bob consisting of wood, cork, aluminum or any desirable buoyant material and having the opening 2 formed near the center thereof. This opening may extend through upon three sides of the bob. The bob may be oval, round or any desired shape in cross section. The double spool 3 (preferably made with different diameter in each part) is journaled in the opening, upon a spindle 4 having one end held in the side wall of the bob and its opposite end held removably in the opening 5 in the spring plate 6. This plate is pivoted at 7 to one side of the bob and extends across the opening 2, and is secured in position by means of the pin 8 projecting from the side of the bob on the opposite side of the opening and entering a corresponding opening in the end of the spring plate. The line is guided to the spool through the slots 9, 9' leading from either end of the bob to the central opening. Supplemental guides 10, 10' are secured at the exterior ends of the slots 9, 9'. The central rim around the spool 3 is slitted at 3' as will be hereinafter described.

The end of the fishing line, secured upon the reel fastened to the rod, is run through the supplemental guide 10, through the guiding slot 9 and reeled upon one side of the doubled spool. Enough of the line is left free for the bait secured thereto to reach the desired depth of water as the bob rests upon the surface thereof. This free portion of the line is run through the slit 3' in the spool and fastened to the opposite side thereof. The end of the line is then passed through the slot 9' and through the supplemental guide 10' at the bottom of the bob.

It is designed so to construct said bob that it may be attached to or detached from the line without removing either the line from the pole or the hook from the line. It will be obvious that as the bob is cast it is held at the end of the line, and that the bob as thus held at the end of the line, during casting, aids by its weight very materially in the accurate casting of the line. As soon as the bob strikes and floats upon the water the weight of the sinkers and bait attached to the supplemental part of the line will unwind the same when the reel is released to let the main portion of the line be slack, and the supplemental portion of the line will thus permit the hook and bait to drop the predetermined distance.

In Figs. 3, 4, and 5 I have shown modifications in the manner of making the bob. The bob shown in Fig. 3 is made in two parts hinged together, the opening 2 being confined entirely within the body of the bob, the spindle 4 being held between the two sides when closed. Fig. 4 shows a form with the line of junction between the two halves at right angles to Fig. 3. Fig. 5 shows a bob made in two parts but in this case the sections are screwed together, the spindle 4 resting in slots made in the threaded collar $a$, the cap $b$ fastening the spindle firmly in place when screwed upon said collar $a$.

I claim—

1. In combination, the bob casing, the doubled spool journaled therein, and having the slit 3' and the line wound about one part of the spool extending through the slit 3' to the other part and wound about the same, said line being arranged to hold the sinker at a predetermined depth, substantially as described.

2. In combination the casing having the opening and the guide ways, the spool arranged in the opening, the line passing through the guides and wound upon said spool and the cover for the bob arranged laterally thereof to leave the opening and guides exposed for the removal of the spool and line, substantially as described.

In witness whereof I have hereunto set my hand in presence of two witnesses.

JOHN RHEINHART KUNZELMAN.

Witnesses:
W. J. SMITH,
F. V. COMFORT.